(12) United States Patent
Ouyang

(10) Patent No.: US 11,522,244 B2
(45) Date of Patent: Dec. 6, 2022

(54) POWER SUPPLY AND ELECTRONIC CIGARETTE HAVING SAME

(71) Applicant: Hong Kong IVPS International Limited, Central OT (HK)

(72) Inventor: Junwei Ouyang, Shenzhen (CN)

(73) Assignee: Hong Kong IVPS International Limited, Central (HK)

( * ) Notice: Subject to any disclaimer, the term of this patent is extended or adjusted under 35 U.S.C. 154(b) by 524 days.

(21) Appl. No.: 16/594,271

(22) Filed: Oct. 7, 2019

(65) Prior Publication Data

US 2020/0221786 A1 Jul. 16, 2020

(30) Foreign Application Priority Data

Sep. 12, 2018 (CN) .......................... 201821492685.6

(51) Int. Cl.
*H01M 50/20* (2021.01)
(52) U.S. Cl.
CPC ........ *H01M 50/20* (2021.01); *H01M 2220/30* (2013.01)
(58) Field of Classification Search
CPC .......................... H01M 50/20; H01M 2220/30
USPC .......................................................... 131/329
See application file for complete search history.

(56) References Cited

U.S. PATENT DOCUMENTS

| 9,203,062 | B2 * | 12/2015 | Andersen | B60L 50/64 |
| 9,901,115 | B2 * | 2/2018 | Liu | A24F 40/40 |
| 2016/0192710 | A1 * | 7/2016 | Liu | A24F 40/44 |
| | | | | 131/329 |
| 2018/0205052 | A1 * | 7/2018 | Chen | H01M 50/262 |
| 2018/0206555 | A1 * | 7/2018 | Chen | H01R 13/521 |
| 2019/0223500 | A1 * | 7/2019 | Ouyang | A24F 40/40 |

FOREIGN PATENT DOCUMENTS

| CN | 203434220 U | * | 2/2014 | | A24F 47/002 |
| CN | 105559151 A | * | 5/2016 | | A24F 40/05 |
| CN | 107112467 A | * | 8/2017 | | H01M 2/10 |
| CN | 107373762 A | | 11/2017 | | |
| CN | 207250590 U | | 4/2018 | | |
| CN | 108201179 A | * | 6/2018 | | A24F 47/00 |
| CN | 108201179 A | | 6/2018 | | |
| EP | 3381306 A1 | * | 10/2018 | | A24F 47/008 |
| KR | 20080006337 U | * | 12/2008 | | |
| KR | 20180100811 A | * | 9/2018 | | H01M 10/482 |
| WO | WO-2015010290 A1 | * | 1/2015 | | H01M 2/1055 |
| WO | WO-2015027473 A1 | * | 3/2015 | | A24F 47/002 |

* cited by examiner

*Primary Examiner* — Peter G Leigh
(74) *Attorney, Agent, or Firm* — IP-PAL Patent US; Klaus Michael Schmid

(57) ABSTRACT

The invention discloses a power supply for an electronic cigarette, comprising a main body and a cover, wherein the main body is provided with an accommodating with an opening, the cover comprises a cover body and a handle, the outer peripheral surface of the cover body is provided with a connection thread, the inner wall of the accommodating chamber is correspondingly provided with an internal thread, so that the cover body is detachably connected to the main body, the handle is mounted to cover body, and when the cover body is mounted to the main body, the cover body is exposed to the outside of the main body, so as to drive the cover body to rotate under an external force.

7 Claims, 4 Drawing Sheets

POWER SUPPLY AND ELECTRONIC CIGARETTE HAVING SAME

TECHNICAL FIELD

The invention relates to a power supply and an electronic cigarette having same.

BACKGROUND

Electronic cigarettes, also known as electronic cigarettes, are mainly used to quit smoking and replace conventional cigarettes. It has an appearance and taste similar to conventional cigarettes, and even has more tastes than conventional cigarettes. It can generate smoke, a taste and a feel like conventional cigarettes. Since electronic cigarettes have no tar, suspension particles and other harmful components in conventional cigarettes, electronic cigarettes have gradually replaced conventional cigarettes in the market However, in order to close the chamber inside the main body of the electronic cigarette, the conventional electronic cigarette is usually provided with a cover, and then the cover is mounted to the main body of the electronic cigarette by correspondingly providing a buckle or an elastic locking structure, and can cover the chamber in an open-close manner so as to replace the parts accommodated in the internal chamber. However, when the cover is fixed to the main body of the electronic cigarette using a buckle or an elastic locking structure, a gap is required between the cover and the main body to facilitate the user to open or close the cover. During long-term use, it is easy to shake and generate noise, and the connection strength is weak. When the electronic cigarette is dropped, the cover is easily separated from the main body of the electronic cigarette, so that the parts accommodated in the internal chamber are scattered, and the parts accommodated in the internal chamber are damaged due to being permeable.

SUMMARY

The main object of the invention is to provide a power supply for an electronic cigarette, which aims to enhance the connection strength between the cover and the main body of the electronic cigarette, and at the same time, avoid the phenomenon that the external water flow is immersed in the internal chamber of the main body of the electronic cigarette.

In order to achieve the above object, the invention provides a power supply for an electronic cigarette, comprising: a main body and a cover, wherein the main body is provided with an accommodating chamber with an opening, the cover comprises a cover body and a handle, the outer peripheral surface of the cover body is provided with a connecting thread, the inner wall of the accommodating chamber is correspondingly provided with an internal thread, so that the cover body is detachably connected to the main body, the handle is mounted to the cover body, and when the cover body is mounted to the main body, the cover body is exposed to the outside of the main body, so as to drive the cover body to rotate under an external force.

Preferably, the handle is rotatably mounted to the cover body, the cover body is provided with a storing groove, and when the handle is rotated to be accommodated in the storing groove, the surface of the handle away from the main body is level with the outer surface of the main body or lower than the outer surface of the main body.

Preferably, the cover body is further provided with a fetching groove communicated with the storing groove so that a part of the side structure of the handle is exposed from the inside of the storing groove.

Preferably, the depth value of the fetching groove gradually reduces from the end close to the storing groove to the end away from the storing groove.

Preferably, the handle is further provided with a notch, and when the handle is accommodated in the storing groove, the notch has an opening facing the fetching groove, and the notch is covered by the outer surface of the handle in the storing groove.

Preferably, the handle comprises a holding member, a connecting member and a rotating shaft, the cover body is further provided with a mounting hole, one end of the mounting hole is exposed to the outer peripheral surface of the cover body and the other end thereof is communicated with the storing groove, one end of the connecting member is fixedly connected to the holding member and the other end thereof is inserted into the storing groove and is provided with a connecting hole through which the rotating shaft passes, and the rotating shaft is inserted into the storing groove along the mounting hole and passes through the connecting hole so that the connecting member is rotatably mounted to the cover body.

Preferably, the cover body is further provided with a disassembling groove, and when the cover body is mounted to the main body, the disassembling groove is exposed outside the main body into which an external disassembling device is inserted to drive the cover body to rotate.

Preferably, the cover is further provided with a sealing member, and the sealing member is sleeved to the outer peripheral surface of the cover body.

Preferably, the power supply further comprises a battery component, the battery component is electrically connected to the main body when being accommodated in the accommodating chamber, the end of the cover body away from the handle is further provided with a conductive member, and when the cover body is mounted to the main body, one end of the conductive member is electrically communicated with the battery component and the other end thereof is electrically communicated with the main body to establish an electrical circuit.

The invention further provides an electronic cigarette, comprising a power supply, wherein the power supply comprises a main body and a cover, the main body is provided with an accommodating chamber with an opening, the cover comprises a cover body and a handle, the outer peripheral surface of the cover body is provided with a connection thread, the inner wall of the accommodating chamber is correspondingly provided with an internal thread, so that the cover body is detachably connected to the main body, the handle is mounted to the cover body, and when the cover body is mounted to the main body, the cover body is exposed to the outside of the main body, so as to drive the cover body to rotate under an external force.

The power supply for an electronic cigarette according to the technical solution of the invention is provided with a connecting thread on the cover. The inner wall of the accommodating chamber is correspondingly provided with an internal thread so as to achieve the threaded connection between the cover and the cover body. The connection is stable and it is not easy to sway. At the same time, the threaded connection can effectively prevent the external water flow from being immersed in the accommodating chamber through the gap between the cover and the inner wall of the accommodating chamber. Further, the cover body is provided with a handle, and the cover body is rotated by rotating the handle, which is convenient for the user to hold and control the cover body to be mounted to or detached from the main body.

BRIEF DESCRIPTION OF THE DRAWINGS

For a better illustration of the embodiments of the invention or the technical solution in the prior art, accompanying drawings needed in the description of the embodiments or the prior art are simply illustrated below. Obviously, the accompanying drawings described below are some embodiments of the invention. For those skilled in the art, other accompanying drawings may be obtained according to the structure shown in these accompanying drawings without creative work.

Figure 1:
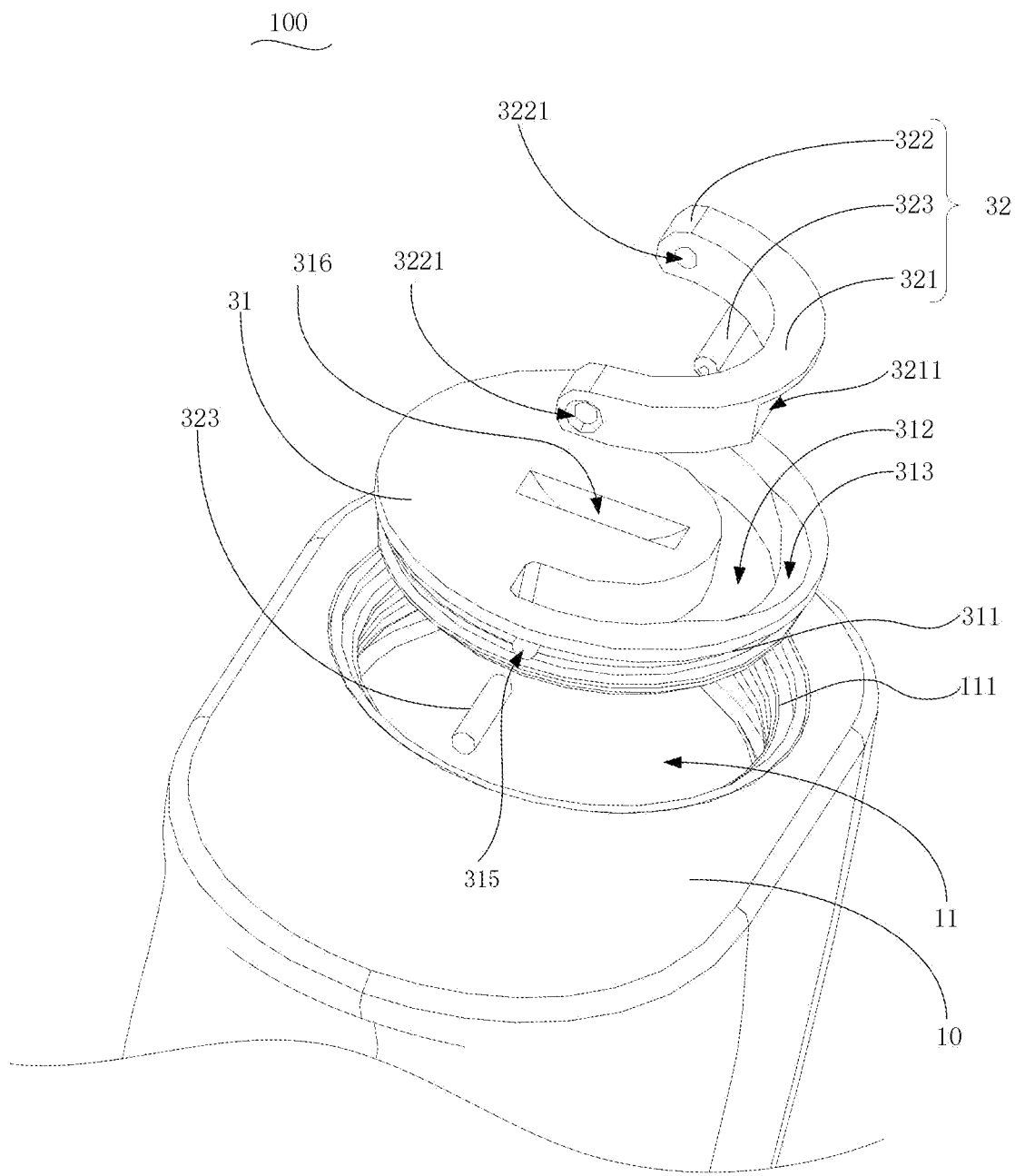
FIG. 1 is an exploded schematic diagram illustrating a connection structure in which a cover is mounted to a main body in a power supply according to the invention.

DESCRIPTION OF THE REFERENCE NUMBERS:

| Reference number | Name of part |
|---|---|
| 100 | Power supply |
| 10 | main body |
| 11 | accommodating chamber |
| 111 | internal thread |
| 30 | cover |
| 31 | cover body |
| 311 | connecting thread |
| 312 | storing groove |
| 313 | fetching groove |
| 314 | Mounting groove |
| 315 | mounting hole |
| 316 | disassembling groove |
| 317 | conductive member |
| 32 | handle |
| 321 | holding member |
| 3211 | notch |
| 322 | connecting member |
| 3221 | connecting hole |
| 323 | rotating shaft |
| 34 | sealing member |

The implementation of aims, the function features and the advantages of the invention are described below in further detail in conjunction with embodiments with reference to the drawings.

DESCRIPTION OF THE EMBODIMENTS

A clear and complete description as below is provided for the technical solution in the embodiments of the invention in conjunction with the drawings in the embodiments of the invention. Obviously, the embodiments described hereinafter are simply part embodiments of the invention, rather than all the embodiments. All other embodiments obtained by those skilled in the art based on the embodiments in the invention without creative work are intended to be included in the scope of protection of the invention.

It should be noted that all directional indications (such as top, bottom, left, right, front, behind . . . . ) in the embodiments of the invention are merely to illustrate a relative position relation, a relative motion condition, etc. between each part in a certain state (for example, the state shown in the drawings). If the state changes, the directional indication changes accordingly.

In addition, if terms "first", "second", etc. appear in the invention, they are merely for the purpose of description, but cannot be understood as the indication or implication of relative importance or as the implicit indication of the number of the designated technical features; therefore, features defined by "first" and "second" may specifically or implicitly comprise at least one such feature. In addition, technical solutions of each embodiment of the invention may be combined mutually; however, this must be carried out on the basis that those skilled in the art can implement the combination. When the combination of technical solutions has a conflict or cannot be implemented, it should considered that such combination of technical solutions does not exist and is not in the scope of protection claimed by the invention.

In the invention, unless otherwise specifically stated and defined, terms "connected", "fixed", etc. should be interpreted expansively. For example, "fixed" may be fixed connection, detachable connection, or integration; may be mechanical connection or electrical connection; direct connection, indirect connection through an intermediate, or internal communication between two elements or interaction of two elements, unless otherwise specifically defined. Those skilled in the art can understand the specific implication of the above terms in the invention according to specific conditions.

The invention provides an electronic cigarette, which comprises an atomizing device (not shown) and a power supply 100 for supplying power to the atomizing device, wherein the atomizing device is provided with an accommodating chamber in which tobacco products are accommodated and a heating component for heating the tobacco products. When the atomizing device is mounted to the power supply 100, the power supply 100 supplies power to the heating component to heat the tobacco products stored in the atomizer to generate smoke for the user to smoke. Herein, the tobacco products may be made of tobacco shred, tobacco tar, cigarettes, or tobacco cartridge prepared from tobacco shred etc. In the embodiment of the invention, the tobacco tar is selected as an example, and the atomizing device in which the tobacco tar is stored is externally connected to the power supply 100.

Referring to FIG. 1 to FIG. 5, a power supply 100 for an electronic cigarette according to the invention comprises a main body 10 and a cover 30, wherein the main body 10 is provided with an accommodating chamber 11 with an opening, the cover 30 comprises a cover body 31 and a handle 32, the outer peripheral surface of the cover body 31 is provided with a connecting thread 311, the inner wall of the accommodating chamber 11 is correspondingly provided with an internal thread 111, so that the cover body 31 is detachably connected to the main body 10, the handle 32 is mounted to the cover body 31, and when the cover body 31 is mounted to the main body 10, the cover body is exposed to the outside of the main body 10, so as to drive the cover body 31 to rotate under an external force.

The power supply 100 for an electronic cigarette according to the technical solution of the invention is provided with a connecting thread 311 on the cover 30. The inner wall of the accommodating chamber 11 is correspondingly provided with an internal thread 111 so as to achieve the threaded connection between the cover 30 and the cover body 31. The connection is stable and it is not easy to sway. At the same time, the threaded connection can effectively prevent the external water flow from being immersed in the accommodating chamber 11 through the gap between the cover 30 and the inner wall of the accommodating chamber 11. Further, the cover body 31 is provided with a handle 32, and the cover body 31 is rotated by rotating the handle 32, which is convenient for the user to hold and control the cover body 31 to be mounted to or detached from the main body 10.

Specifically, as shown in FIG. 1, in the embodiment of the invention, the handle 32 is rotatably mounted to the cover body 31, the cover body 31 is correspondingly provided with a storing groove 312 in which the handle 32 is accommodated, and when the handle 32 is rotated to be accommodated in the storing groove 312, the surface of the handle 32 away from the main body 10 is level (i.e., flush) with the outer surface of the main body 10 or lower than the outer surface of the main body 10. Herein, in the present embodiment, the handle 32 is rotatably mounted to the cover body 31, and when it is not required in use, the handle 32 is rotated to be accommodated in the storing groove 312, thereby effectively preventing the handle 32 from being exposed and damaged all the time. At the same time, when being is accommodated in the storing groove 312, the handle 32 is level with the outer surface of the main body 10 or lower than the outer surface of the main body 10, effectively preventing the phenomenon that when the user puts the main body 10 of the electronic cigarette into a pocket, the handle 32 which is convexly provided causes a frictional collision on the articles in the pocket to result in scratching. Meanwhile, if the accommodating chamber 11 is provided at the bottom of the main body 10, the handle 32 embedded in the surface of the main body 10 or level with the surface of the main body 10 has no adverse effects on normal placement smoothness of the main body 10.

Figure 3:
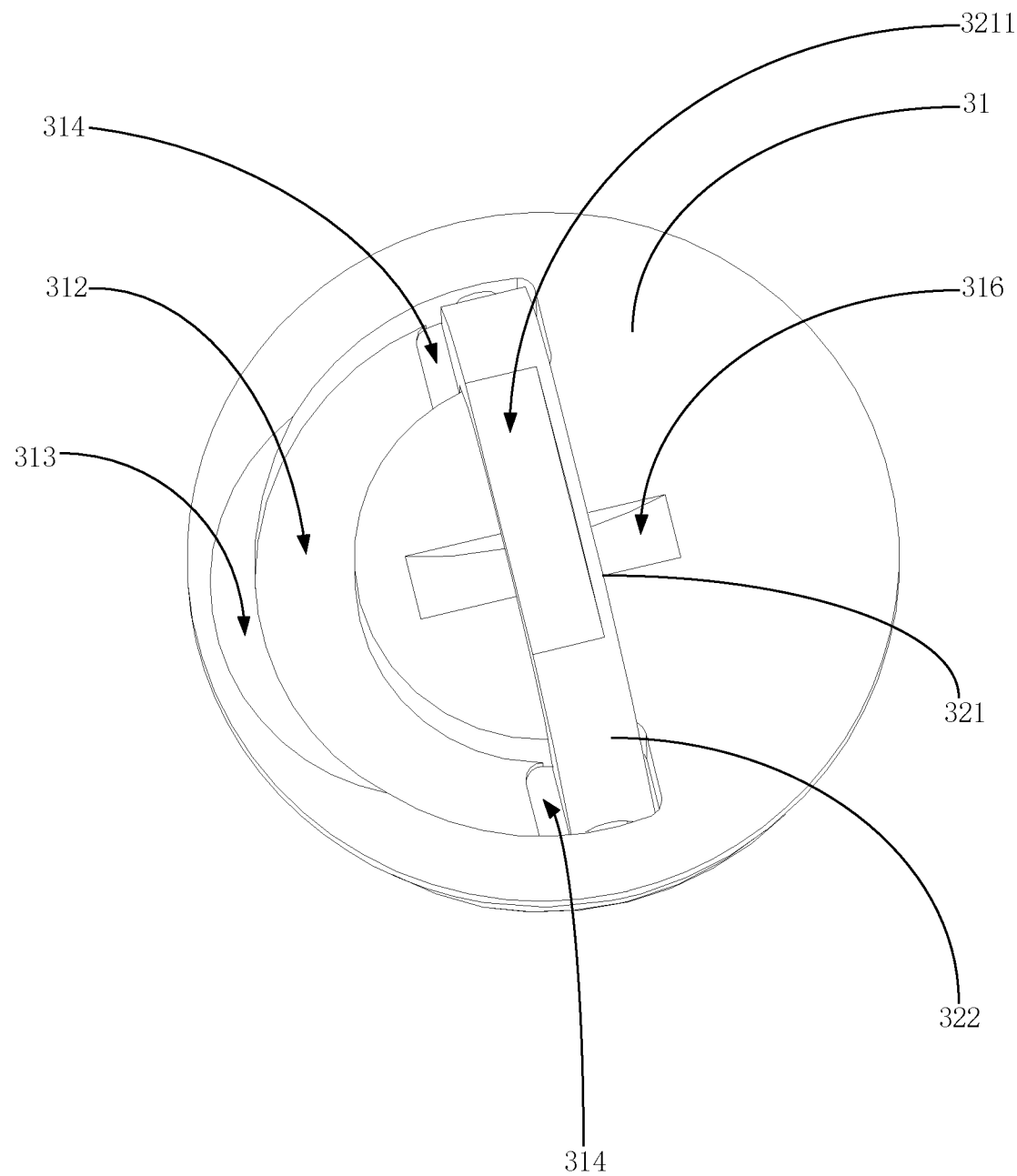
FIG. 3 is a perspective schematic diagram illustrating a connection structure in which a handle rotates to be exposed to the outside of a cover according to the invention.

Further, as shown in FIG. 1 or FIG. 3, in the embodiment of the invention, the cover body 31 is further provided with a fetching groove 313 communicated with the storing groove 312 so that a part of the side structure of the handle 32 is exposed from the inside of the storing groove 312. Herein, in the present embodiment, when the handle 32 is accommodated in the storing groove 312, a part of the side structure of the handle 32 is exposed from the fetching groove 313, so that the user can facilitate the user to abut the fetching groove 313 against the side wall of the handle 32 to rotate the handle 32 out of the storing groove 312.

Specifically, the depth value of the fetching groove 313 gradually reduces from the end close to the storing groove 312 to the end away from the storing groove 312. Herein, in the present embodiment, the direction of the notch of the fetching groove 313 is the same as the direction of the notch of the storing groove 312, and the distance value between the notch plane of the fetching groove 313 and the inner groove wall that the notch faces is the depth value of the fetching groove 313. At the same time, the depth value of the fetching groove 313 gradually reduces from one end close to the storing groove 312 to the end away from the storing groove 312, and presents an arc-shaped transition. When the user uses the storing groove, the storing groove is fit to the finger, preventing the phenomenon that a cliff-type transition manner causes a poor touch.

Figure 4:
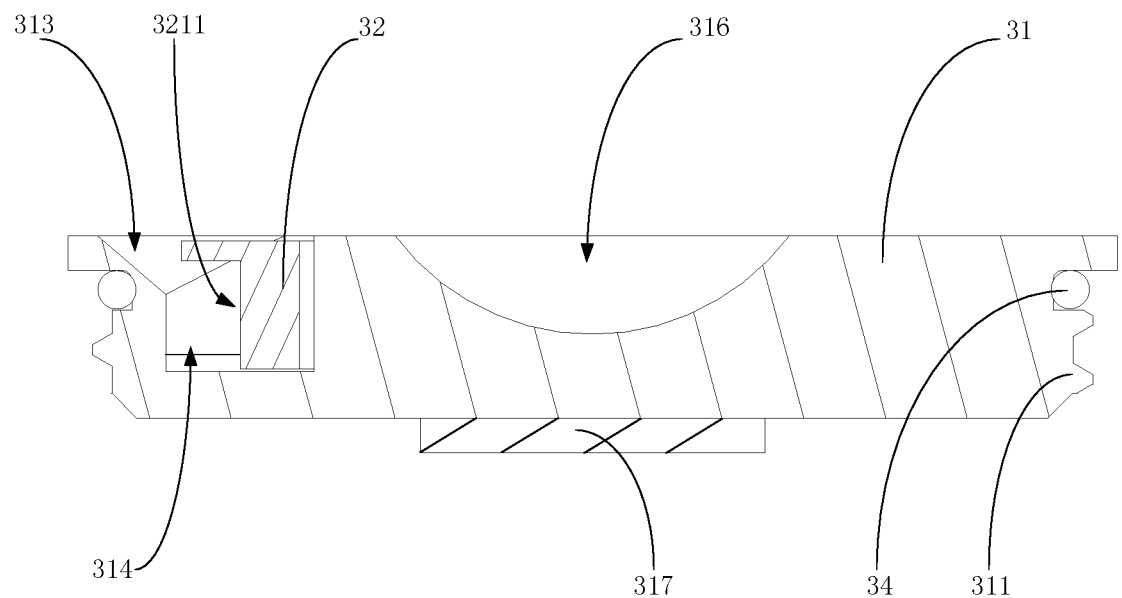
FIG. 4 is a cross-sectional schematic diagram illustrating a connection structure of a cover according to the invention.

Further, as shown in FIG. 3 or FIG. 4, in the embodiment of the invention, the handle 32 is further provided with a notch 3211, and when the handle 32 is accommodated in the storing groove 312, the notch 3211 has an opening facing the fetching groove 313, and the notch 3211 is covered by the outer surface of the handle 32 in the storing groove 312. Herein, in the present embodiment, the handle 32 is further provided with a notch 3211 on the surface facing the fetching groove 313. At the same time, the notch 3211 is hidden by the outer surface of the handle 32 so that the handle 32 exposed to the surface of the cover body 31 is completely shaped to effectively enhance the aesthetic performance of the product shape; at the same time, the side structure of the handle 32 facing the fetching groove 313 is in a stepped shape. When the user holds the handle 32 through the fetching groove 313, the finger portion is accommodated in the notch 3211 and is abutted against the stepped side structure, so as to avoid contact between the finger of the user and the outer wall of the smooth handle 32 in a narrow space, without any stress points in the front direction. The handle 32 is driven only by friction, resulting in inconvenience in handling, and further effectively facilitating user manipulation of the handle 32.

Figure 2:
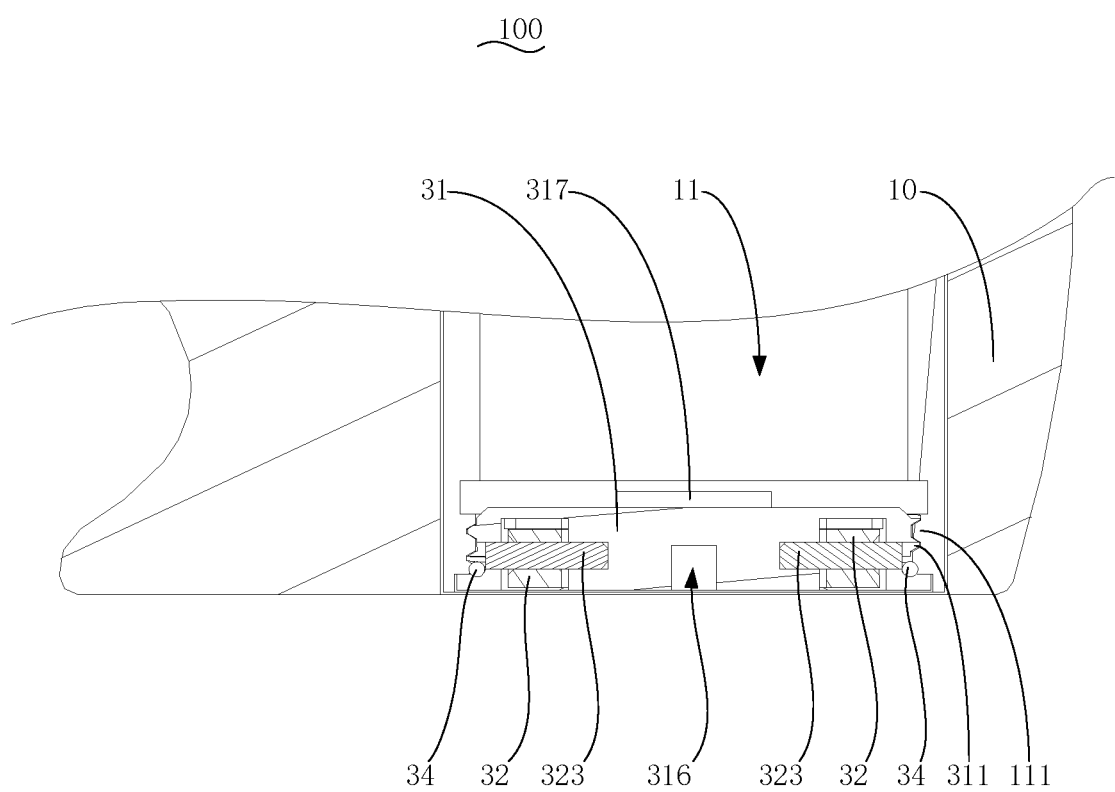
FIG. 2 is a cross-sectional schematic diagram illustrating a connection structure in which a cover is mounted to a main body in a power supply according to the invention.
Figure 5:
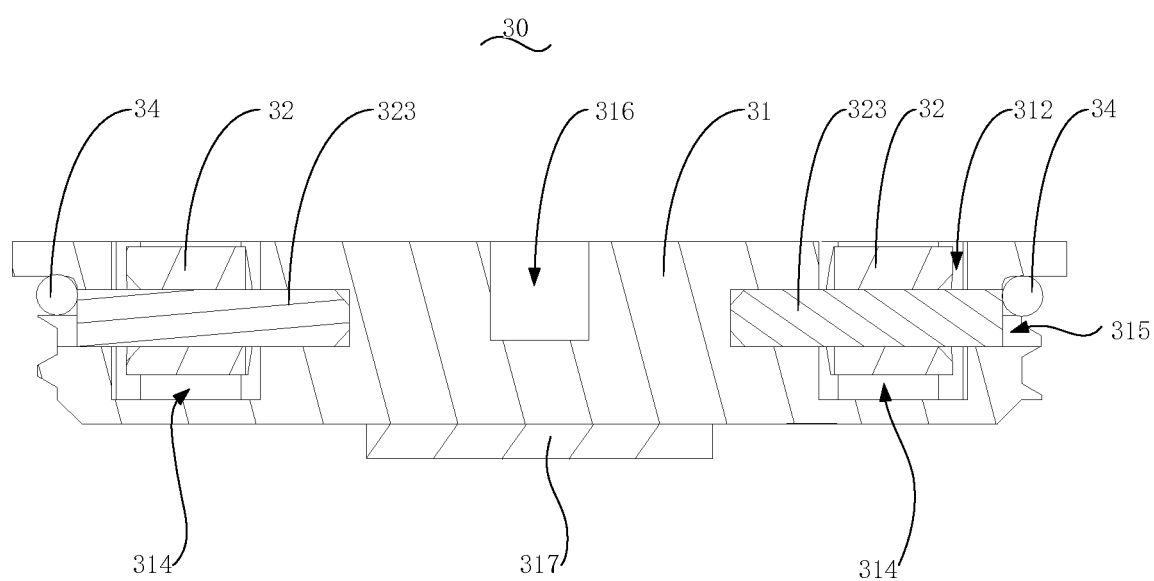
FIG. 5 is a cross-sectional schematic diagram illustrating a connection structure of a cover according to the invention from another perspective.

Specifically, as shown in FIG. 1, FIG. 2 or FIG. 5, in the embodiment of the invention, the handle 32 comprises a holding member 321, a connecting member 322 and a rotating shaft 323, the cover body 31 is further provided with a mounting hole 315, one end of the mounting hole 315 is exposed to the outer peripheral surface of the cover body 31 and the other end thereof is communicated with the storing groove 312, one end of the connecting member 322 is fixedly connected to the holding member 321 and the other end thereof is inserted into the storing groove 312 and is provided with a connecting hole 3221 through which the rotating shaft 323 passes, and the rotating shaft 323 is inserted into the storing groove 312 along the mounting hole 315 and passes through the connecting hole 3221 so that the connecting member 322 is rotatably mounted to the cover body 31. Herein, in the present embodiment, the handle 32 has a semi-annular shape. Both semi-annular ends form the connecting member 322, and are provided with connecting holes 3221. The annular body of the semi-annular ring forms a holding member 321, and the outer peripheral surface of the cover body 31 is provided with a mounting hole 315. In the process of mounting, the connecting member 322 is accommodated in the storing groove 312, and the connecting hole 3221 faces the mounting hole 315. The rotating shaft 323 is then inserted into the connecting hole 3221 along the mounting hole 315 to rotatably mount the handle 32 to the cover body 31. By providing a mounting hole 315 on the outer peripheral surface, it is not necessary to provide a large space of the storing groove 312 in which the rotating shaft 323 is mounted. The space of the storing groove 312 can be adapted to the structure of the handle 32. When the handle 32 is accommodated in the storage space, the side structure of the handle 32 is fit to the inner wall of the storing groove 312 to form a transition fit, effectively preventing the phenomenon that it is easy to sway and is detached from the storing groove when the handle 32 is accommodated in the storing groove 312.

Specifically, as shown in FIG. 3, in the embodiment of the invention, in order to ensure that the handle 32 is accommodated in the storing groove 312, the outer surface of the handle 32 is level with the outer surface of the cover body 31. At the same time, the phenomenon is prevented that the thickness of the handle 32 is thin so as to result in a weak connection strength. The storing groove of the embodiment is further provided with a mounting groove 314 facing the inner groove wall of the notch. The mounting hole 315 is provided facing the mounting groove 314, that is, the mounting hole 315 is lower than the groove wall of the storing groove 312 facing the notch. When the connecting portion is mounted in the storing groove 312, the connecting portion is partially inserted into the mounting groove 314. The rotating shaft 323 passes through the mounting hole 315 and the connecting hole 3221, so as to rotatably mount the handle 32 to the cover body 31. The end of the connecting member 322 away from the holding member 321 is inserted into the mounting groove 314 and is rotated in the mounting groove 314 so that the thickness value of the handle 32 can be set to be the same as the thickness value of the storing groove 312. The rotating shaft 323 is prevented from being provided facing the storing groove 312. A space for the rotation needs to be reserved between the handle 32 and the inner groove wall of the storing groove 312, resulting in a decrease in the thickness of the handle 32, a weak connection strength and easy damage.

It can be understood that, in the actual application process, it is not limited to the above manner in which the handle 32 adopts a semi-annular shape and then is rotatably mounted to the cover body 31 through two rotating shafts 323. For example, the handle 32 may also be provided in a T-shape. The manner, in which a connecting hole 3221 is provided at one end of the T-shaped longitudinal side through which the rotating shaft 323 passes so as to be rotatably mounted to the cover body 31, also falls within the scope of protection of the invention; similarly, the manner, in which the shape of the handle 32 is only changed using a semi-rectangular shape so that the handle is rotatably mounted to the cover body 31, also falls within the scope of protection of the invention.

Further, as shown in FIG. 3 or FIG. 4, in the embodiment of the invention, the cover body 31 is further provided with a disassembling groove 316, and when the cover body 31 is mounted to the main body 10, the disassembling groove 316 is exposed outside the main body 10 into which an external disassembling device is inserted to drive the cover body 31 to rotate. Herein, in the present embodiment, the disassembling groove 316 is a straight groove or a cross-shaped groove or other polygonal grooves. In the embodiment, the disassembling groove 316 is a straight groove into which an external disassembling device is inserted to drive the cover body 31 to rotate. A straight disassembling groove 316 is provided, the occupied space is small, and at the same time, the phenomenon is effectively prevented that the handle 32 is damaged so that the cover 30 cannot be disassembled.

Further, as shown in FIG. 4 or FIG. 5, in the embodiment of the invention, the cover 30 is further provided with a sealing member 34, and the sealing member 34 is sleeved to the outer peripheral surface of the cover body 31. Herein, in the present embodiment, the sealing member 34 is made of an elastic silicone ring. The end of the cover body 31 away from the main body 10 is provided with a flange. The position connecting the cover body 31 and the flange is provided with a groove in which the sealing member 34 is mounted. When the cover body 31 is mounted to the main body 10, the sealing ring is abutted against the inner wall of the accommodating chamber 11, thereby further improving waterproof performance.

Further, as shown in FIG. 4 or FIG. 5, in the embodiment of the invention, the power supply 100 further comprises a battery component (not shown), the battery component is electrically connected to the main body 10 when being accommodated in the accommodating chamber 11, the end of the cover body 31 away from the handle 32 is further provided with a conductive member 317, and when the cover body 31 is mounted to the main body 10, one end of the conductive member 317 is electrically communicated with the battery component and the other end thereof is electrically communicated with the main body 10 to establish an electrical circuit. Herein, in the present embodiment, the accommodating chamber 11 is used for accommodating the battery component. The cover body 31 and the main body 10 are both made of electrically conductive materials. The cover body 31 is convexly provided with a conductive member 317 to be abutted against the battery component to establish an electrical connection. When the cover body 31 is mounted to the main body 10, the battery component is electrically connected to the positive electrode of the main body 10. The cover body 31 is abutted against the main body 10 to establish an electrical connection to form a negative electrode, so as to establish an electrical circuit. There is no need to carry out wiring inside the main body 10, which effectively saves the product wiring space, thereby reducing the product volume and facilitating the user to carry.

It can be understood that the accommodating chamber 11 is not limited to accommodating a battery component as described above. For example, in another embodiment of the invention, the atomizer is built in the main body 10, and the heating device is used to heat the accommodating chamber 11. The manner, in which the accommodating chamber 11 is used for accommodating cigarettes, also falls within the scope of protection of the invention.

The invention further provides an electronic cigarette, which comprises an atomizer and a power supply 100 for an electronic cigarette. Refer to the above embodiment for the specific structure of the power supply 100 for the electronic cigarette. Due to the use of all the technical solutions of all the above embodiments, the electronic cigarette has at least all the beneficial effects brought by the technical solutions of the above embodiments, which will not be described in detail herein.

The above are preferred embodiments of the invention merely and are not intended to limit the patent scope of the invention. Any equivalent structures made according to the description and the accompanying drawings of the invention without departing from the idea of the invention, or any equivalent structures applied in other relevant technical fields directly or indirectly are intended to be included in the patent protection scope of the invention.

What is claimed is:

1. A power supply for an electronic cigarette, comprising:
   a main body (10); and
   a cover (30),
   wherein the main body (10) is provided with an accommodating chamber (11) with an opening, the cover (30) comprises a cover body (31) and a handle (32), an outer peripheral surface of the cover body (31) is provided with a connecting thread (311), an inner wall of the accommodating chamber (11) is correspondingly provided with an internal thread (111), so that the cover body (31) is detachably connected to the main body (10), the handle (32) is mounted to the cover body (31), and when the cover body (31) is mounted to the main body (10), the cover body is exposed to outside of the main body (10), so as to drive the cover body (31) to rotate under an external force;
   wherein the handle (32) is rotatably mounted to the cover body (31), the cover body (31) is provided with a storing groove (312), and when the handle is rotated to be accommodated in the storing groove, the surface of the handle (32) away from the main body (10) is level with the outer surface of the main body (10) or lower than the outer surface of the main body (10);

wherein the cover body (31) is further provided with a fetching groove (313) communicated with the storing groove (312) so that a part of the outer peripheral surface of the handle (32) is exposed from inside of the storing groove (312); and wherein the depth value of the fetching groove (313) gradually reduces from an end close to the storing groove (312) to an end away from the storing groove (312).

2. The power supply for an electronic cigarette according to claim 1, wherein the handle (32) is further provided with a notch (3211), and when the handle (32) is accommodated in the storing groove (312), the notch (3211) has an opening facing the fetching groove (313), and the notch (3211) is covered by an outer surface of the handle (32) in the storing groove (312).

3. The power supply for an electronic cigarette according to claim 1, wherein the handle (32) comprises a holding member (321), a connecting member (322) and a rotating shaft (323), the cover body (31) is further provided with a mounting hole (315), one end of the mounting hole (315) is exposed to the outer peripheral surface of the cover body (31) and the other end thereof is communicated with the storing groove (312), one end of the connecting member (322) is fixedly connected to the holding member (321) and the other end thereof is inserted into the storing groove (312) and is provided with a connecting hole (3221) through which the rotating shaft (323) passes, and the rotating shaft (323) is inserted into the storing groove (312) along the mounting hole (315) and passes through the connecting hole (3221), so that the connecting member (322) is rotatably mounted to the cover body (31).

4. The power supply for an electronic cigarette according to claim 1, wherein the cover body (31) is further provided with a disassembling groove (316), and when the cover body (31) is mounted to the main body (10), the disassembling groove (316) is exposed outside the main body (10) into which an external disassembling device is inserted to drive the cover body (31) to rotate.

5. The power supply for an electronic cigarette according to claim 1, wherein the cover (30) is further provided with a sealing member (34), and the sealing member (34) is sleeved to the outer peripheral surface of the cover body (31).

6. The power supply for an electronic cigarette according to claim 1, wherein the power supply (100) further comprises a battery component, the battery component is electrically connected to the main body (10) when being accommodated in the accommodating chamber (11), the end of the cover body (31) away from the handle (32) is further provided with a conductive member (317), and when the cover body (31) is mounted to the main body (10), one end of the conductive member (317) is electrically connected with the battery component and the other end thereof is electrically connected with the main body (10) to establish an electrical circuit.

7. An electronic cigarette, comprising the power supply (100) for an electronic cigarette according to claim 1.

* * * * *